United States Patent [19]

Cooper et al.

[11] Patent Number: 5,239,044
[45] Date of Patent: Aug. 24, 1993

[54] PREPARATION OF POLYARYLENESULFONE FROM BIS(CHLOROARYL) SULFONE, DIHYDRIC PHENOL AND DIFLUORODIPHENYLSULFONE

[75] Inventors: Richard R. Cooper; David G. Parker, both of Cleveland, England

[73] Assignee: Imperial Chemical Industries, PLC, Welwyn Garden City, England

[21] Appl. No.: 960,299

[22] Filed: Oct. 13, 1992

Related U.S. Application Data

[63] Continuation of Ser. No. 698,259, May 6, 1992, abandoned, which is a continuation of Ser. No. 553,799, Jul. 18, 1990, abandoned.

[51] Int. Cl.$^5$ .............................................. C08G 75/20
[52] U.S. Cl. ................................... 528/174; 528/171; 528/391
[58] Field of Search ..................... 528/174, 171, 391

[56] References Cited

U.S. PATENT DOCUMENTS

| | | | |
|---|---|---|---|
| 3,933,764 | 1/1976 | McMaster | 260/79.3 |
| 4,105,636 | 8/1978 | Taylor . | |
| 4,116,940 | 9/1978 | Korshak et al. | 528/173 |

FOREIGN PATENT DOCUMENTS

| | | | |
|---|---|---|---|
| 0047999 | 3/1982 | European Pat. Off. . | |
| 0125816 | 11/1984 | European Pat. Off. . | |
| 0027723 | 2/1983 | Japan | 528/174 |
| 60-040454 | 9/1985 | Japan . | |
| 1-245018 | 9/1989 | Japan | 528/174 |
| 1294982 | 11/1972 | United Kingdom . | |
| 1396990 | 6/1975 | United Kingdom . | |
| 1518450 | 7/1978 | United Kingdom . | |

OTHER PUBLICATIONS

Chemical Abstracts, vol. 99, 1983, Ref. 88765f.

*Primary Examiner*—Harold D. Anderson
*Attorney, Agent, or Firm*—Cushman, Darby & Cushman

[57] ABSTRACT

A polyarylsulphone is prepared by the polycondensation of a bisphenol with an aryl dichloride, at least one of which contains a sulphone group, in the presence of a base and introducing into the reaction mixture less than 5% mole, relative to the aryl dichloride, of 4,4'-difluorodiphenylsulphone. The bisphenol and aryldichloride can be of 4,4'-dihydroxydiphenylsulphone and 4,4'-dichlorodiphenylsulphone respectively. The difluoro compound is added when the polymerisation is essentially complete. The polymer product if of improved quality.

10 Claims, No Drawings

PREPARATION OF POLYARYLENESULFONE FROM BIS(CHLOROARYL) SULFONE, DIHYDRIC PHENOL AND DIFLUORODIPHENYLSULFONE

This is a continuation of application Ser. No. 07/698,259, filed on May 6, 1992, which was abandoned upon the filing here of and which is a continuation of Ser. No. 07/553,799, filed Jul. 18, 1990, now abandoned.

The invention relates to a polycondensation process and in particular, to the production of polyarylsulphones.

Polyarylsulphones are commonly made by polycondensation in the presence of a base of a bis-phenol with an aryldihalide, said dihalide preferably containing activated halogen. GB-A-1078234, 1153035, 1569602, 1569603 and 1586972 and Canadian 847963 describe such processes. Activation of halogen is preferably by a sulphone group ortho-, or preferably para-, thereto. As aryldihalide, chloro-compounds are more readily available and less expensive than the corresponding fluorocompounds, but are less reactive.

It is proposed in Japanese laid-upen application 58027723-A and corresponding accepted application 85040454-B to carry out the polycondensation by reacting 4,4'-dihydroxy-diphenylsulphone with 0.75–0.95 molar 4,4'-dichloro-diphenylsulphone, then adding 4,4'-difluoro-diphenylsulphone up to the molar equivalent (preferably 0.99 to 1.01) and reacting the mixture further.

We have now found that when a higher proportion of chloro compound is used, namely substantial equivalence or even more, the addition of the fluoro compound is nonetheless useful in controlling the molecular weight of the polymer and improving its colour.

According to the invention a process for producing a polyarylenesulphone by polycondensation in the presence of an alkali carbonate of one or more bis(chloroaryl) sulphones and one or more dihydric phenols, adding 4,4'-difluorodiphenyl sulphone to the resulting reaction mixture and reacting the mixture further is characterised in that (a) the polycondensation reaction mixture contains bis(chloroaryl)sulphone at up to 6% mole excess over dihydric phenol;
(b) the added 4,4'-difluorodiphenylsulphone is up to 5% equivalent of the bis(chloroaryl) sulphone;
(c) the 4,4'-difluoro diphenylsulphone is added after the polycondensation is essentially complete; and
(d) after adding the 4,4'-difluorodiphenylsulphone, reaction is continued at least 0.1 hour.

Preferably in the bis(chloroaryl) sulphone the chlorine atom is para- to a sulphone group. We particularly prefer that the dichloride be 4,4'-dichlorodiphenylsulphone.

Dihydric phenols which may be used include hydroquinone, 4,4'-dihydroxybiphenyl, 4,4'-dihydroxydiphenylsulphone and 2,2-bis-(4-hydroxyphenyl) propane, or a mixture containing at least one of these. At least the molar equivalent, more preferably a slight excess, of aryldichloride is used, especially up to 5%, mole. When, however, the bis(chloroaryl) sulphone and the bisphenol are in such essentially equimolar proportions slight variations in the quantities of reactants charged can have an appreciable, and usually undesired, effect on the molecular weight of the polymer.

By "essentially complete" is meant that polycondensation has proceeded to a polymer molecular weight corresponding to a reduced viscosity from at least 80% of the design level to typically 20–100% above the design level. Typically the design level of reduced viscosity is in the range 0.3 to 1.0, measured by the method described hereinafter. In normal practice, several grades within that range are supplied by a given manufacturer, and the process of the invention is adjusted from batch to batch to produce the different grades required.

Polycondensation may be carried out in the presence of an inert solvent, or in the absence of a solvent. Preferably a solvent is employed and is an aliphatic or aromatic sulphoxide or sulphone of formula

where
a is 1 or 2; and
R or R', which may be the same or different, are alkyl or aryl groups, and may together form a divalent radical.

Solvents of this type include dimethyl sulphoxide, dimethyl sulphone, and sulpholane (1,1-dioxothiolan) but the preferred solvents are aromatic sulphones of the formula

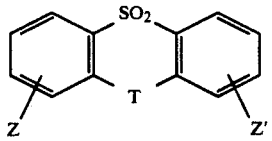

where
T is a direct link, an oxygen atom or two hydrogen atoms (one attached to each benzene ring); and
Z and Z', which may be the same or different, are hydrogen atoms, alkyl, alkaryl, aralkyl or aryl groups.

Examples of such aromatic sulphones include diphenylsulphone, ditolylsulphone, dibenzothiophen dioxide, phenoxathiin dioxide and 4-phenylsulphonyl biphenyl. Diphenylsulphone is the preferred solvent. Other solvents that may be used include dimethylsulphone, N,N-dimethyl formamide and N-methyl-2-pyrrolidone.

Polycondensation is effected in the presence preferably of at least one alkali metal hydroxide or carbonate added as such or carbonate added as bicarbonate.

If an alkali metal hydroxide is used, this is preferably pre-reacted with the dihydric phenol. The resulting phenate should preferably be in a finely divided form, for example having a particle size of less than 1 mm, preferably less than 0.5 mm. The phenate is conveniently formed in aqueous or methanolic solution and, since the polycondensation should be effected in the essential absence of —OH containing compounds such as water and alcohols, it is necessary to remove such compounds prior to effecting the polycondensation. Thus, the dihydric phenol may be stirred in a solution of alkali metal hydroxide in water or a 90:10 by volume mixture of methanol and water, preferably in the ratio of 1 mole of phenol groups to at least one mole of hydroxide, until it has dissolved; then the solvent may be evaporated off, for example by spray drying. Any hydrated phenate obtained is preferably dehydrated for example by evaporation under reduced pressure, or by heating preferably in the presence of a diaryl sulphone, at above 150° C., preferably above 200° C. and preferably under partial vacuum, e.g. 25 to 400 torr. A particular advantage in dehydration of the phenate in the presence of a diaryl sulphone in the polycondensation vessel is that, because the diaryl sulphone does not boil, there is no splashing of the phenate on the walls of the reaction vessel and hence stoichiometry of the polycondensation reaction is maintained. Any aryldichloride to be used in the polycondensation can be added after evolution of water has ceased, for example as indicated by cessation of foaming. After removal of the water and addition of any necessary aryldichloride and/or additional base, the temperature is increased to the polycondensation temperature.

If the base is an alkali metal carbonate added as such or as bicarbonate, whether for the whole base requirement or as an addition to the phenate, it is preferably anhydrous. However, if hydrated it may be dehydrated during heating up to the polycondensation temperature if that temperature is high enough.

The alkali metal hydroxide, carbonate or bicarbonate should be used in at least the stoichiometric proportion with respect to the phenolic groups. It is preferred to use a slight excess of base, preferably in the range to 25%, particularly 1 to 15%, molar. If desired, a mixture of bases may be used, for example a mixture of carbonates and/or bicarbonates as disclosed in GB-A-1586972. We prefer to effect polycondensation using an alkali metal carbonate as the base. The alkali metal carbonate is conveniently potassium carbonate. However, other alkali metal carbonates, or mixtures thereof, may be used, for example sodium carbonate together with a carbonate of an alkali metal having a higher atomic number than sodium, such as potassium carbonate.

The polycondensation reaction is carried out at least 150° C., preferably 200° to 400° C., particularly 250° to 350° C., for at least part of the reaction time. An increase in reaction temperatures leads to shorter reaction times but with risk of product decomposition and/or side reactions. A temperature should be used which maintains the polymeric material in solution.

Particularly when using relatively volatile monomers such as hydroquinone, it may be advantageous to use a prepolycondensation stage at a temperature at which oligocondensation occurs but little, if any, polycondensation occurs. Such prepolycondensation can be effected at 180° to 250° C., particulary 200° to 230° C. The oligocondensation is believed to result in the formation of relatively involatile oligomers and hence to reduce the possibility of volatile monomers being removed from the reaction mixture.

The polycondensation is preferably carried out in an inert atmosphere e.g. argon or nitrogen. The reaction vessel can be made from glass but for operation on a large scale is preferably made from stainless steels (other than those which undergo surface crazing at the reaction temperatures in the presence of alkali metal halide), or made of, or lined with, titanium, nickel or an alloy thereof or some similarly inert material.

At least the last stage of poly-condensation before adding the difluorodiphenyl sulphone is preferably effected at 250° up to 350° C., suitably for at least 0.5, more typically at least one, hour, in order to essentially complete this reaction. Of course, the process conditions necessary depend on many factors including scale of operation, reactants used, nature of base and solvent and temperatures and times used in attaining the final temperature. As reaction proceeds, the molecular weight of the polymer, and hence the viscosity of the reaction mixture, increases. One indication that reaction is essentially complete is there is little further increase in molecular weight and viscosity. The progress of polycondensation can be followed by monitoring the viscosity of the reaction mixture, for example by noting variations in the power or torque of the agitator. The relation of the power or torque of the agitator to polymer molecular weight depends on the particular system used and will be unique for each system, but in general, they increase as the polycondensation proceeds. Whether or not essentially constant values are achieved, the time required to achieve essentially complete reaction may be known from previous experience. Thus the 4,4'-difluorodiphenylsulphone may be added after a pre-determined time, or when the power or torque of the agitator attains an essentially constant value or attains or approaches a pre-determined value.

The effects of the 4,4'-difluorodiphenylsulphone depend on the proportion added. At not more than about 0.5% molar, relative to the bis(chloroaryl) sulphone, it essentially prevents further polycondensation by reacting with end-groups -OM (where M is an alkali metal) on the polymer chain. Little effect is achieved at less than 0.1% molar. At 0.5 to 5% molar stabilisation or a decrease in the molecular weight of the polymer occurs, to an extent dependent on the quantity of 4,4'-difluorodiphenylsulphone, on the time at high temperature subsequent to the addition and on the extent of polycondensation prior to the addition. The effect of the 4,4'-difluorodiphenylsulphone may be influenced by the addition of base together therewith, but addition of such extra base is not necessary if is a sufficient excess was used in polycondensation. If the polymer molecular weight is greater than desired, the addition of a suitable proportion of 4,4'-difluorodiphenylsulphone can decrease it to the desired value. In general, up to 2.5% molar, particularly up to 1.5 or even 1.0% molar, is sufficient to give the desired effect.

The addition of the 4,4'-difluorodiphenylsulphone generally results in a polycondensation mixture, and hence polymer, having an improved colour.

After the 4,4'-difluorodiphenylsulphone has been added and the reaction mixture has been maintained at high temperature for the further period, which is particularly at least 0.25, and may be several, for example up to 5, hours, the reaction mixture is cooled and the polymer is recovered. Any suitable technique may be used to separate the polymer from any polycondensation solvent used and to remove alkali metal salts, particularly alkali metal halides, from the polymer.

If the polycondensation solvent is a liquid at ambient temperature and the polymer is insoluble in the cold solvent, the polymer may be separated by filtration. The recovered polymer will usually contain at least some of the alkali metal salts from the reaction mixture and is treated, after being ground or otherwise treated to reduce particle size, if necessary, with a solvent for the alkali metal salts, for example by extraction with water. If the polymer is soluble in the liquid polycondensation solvent at ambient temperature, the liquid is filtered to remove any insoluble alkali metal salts and subjected to a suitable evaporation process to remove the solvent, the polymer product thus obtained typically being essentially free from alkali metal salts but any residual salts can be removed as described herein. If the polycondensation solvent is a solid at ambient temperature, a solid mass is obtained on cooling and this is ground or otherwise treated to obtain particles of small particle size, preferably all below 0.5 mm, and is then subjected to extraction in turn with solvent for the polycondensation solvent and with solvent for the alkali metal salts, for example acetone and methanol to remove solid sulphone solvents and water to remove the alkali metal salts.

Further aspects of the invention are set out in the following examples, in which Examples 1-4 illustrates molecular weight control and Examples 5-7 show the effect of the invention on molecular weight and colour of polymer.

EXAMPLE 1

4,4'-dihydroxydiphenylsulphone (62.56 g, 0.2500 mole), 4,4'-dichlorodiphenylsulphone (72.52 g, 0.2525 mole), diphenyl sulphone (126.6 g), and anhydrous analytical grade potassium carbonate (35.26 g, 0.2551 mole), were charged to a 3-necked flask of capacity 500 cm$^3$ fitted with nitrogen purge, stirrer and air condenser.

The flask was heated on an oil bath to 225° C., maintained at 225° C. for 1.5 hours, heated to 265° C., maintained at 265° C. for 1.5 hours, then heated to 285° C. and maintained at 285° C. for 1.5 hours.

Then 4,4'-difluorodiphenylsulphone (0.9519 g, 0.003744 mole, 1.48% molar relative to the 4,4'-dichlorodiphenylsulphone) was added and the reaction mixture was stirred at 285° C. for a further 130 minutes, during which time samples were removed therefrom.

To monitor the course of polycondensation, the reduced viscosity (RV) of samples of the reaction mixture was determined as described in Note (d) to Table 1, in which the results are shown. Since the solution contains only about 1% of diphenyl sulphone in addition to polymer and dimethyl formamide, the measured RV approximates that of pure polymer.

The remaining reaction mixture was then cooled, the solid ground to particles of maximum size 0.5 mm, and the alkali metal salts and diphenylsulphone extracted using methanol, then water and then an acetone/methanol (1:9 weight ratio) mixture.

EXAMPLE 2 AND 3

The procedure of Example 1 was repeated with the exception that smaller proportions of 4,4'-difluorodiphenylsulphone were used.

COMPARATIVE EXAMPLE A

The procedure of Example 1 was repeated with the exception that 4,4'-dichlorodiphenylsulphone (1.0864 g, 0.003783 moles, 1.5% molar relative to the original quantity of that reactant) was added. The results are shown in Table 1.

TABLE 1

| Ex or Comp Ex | Additive Type (a) | Wt (g) | Mole % (b) | Sample Time (c) | RV (d) |
| --- | --- | --- | --- | --- | --- |
| 1 | F | 0.9519 | 1.48 | −5 | 1.2141 |
| 1 | F | 0.9519 | 1.48 | 10 | 0.8133 |
| 1 | F | 0.9519 | 1.48 | 30 | 0.6466 |
| 1 | F | 0.9519 | 1.48 | 70 | 0.6230 |
| 1 | F | 0.9519 | 1.48 | 130 | 0.6321 |
| 2 | F | 0.6373 | 0.99 | −5 | 0.8750 |
| 2 | F | 0.6373 | 0.99 | 10 | 0.7439 |
| 2 | F | 0.6373 | 0.99 | 30 | 0.7117 |
| 2 | F | 0.6373 | 0.99 | 60 | 0.8518 |
| 2 | F | 0.6373 | 0.99 | 110 | 0.9196 |
| 3 | F | 0.3192 | 0.50 | −5 | 0.8391 |
| 3 | F | 0.3192 | 0.50 | 10 | 0.8146 |

TABLE 1-continued

| Ex or Comp Ex | Additive Type (a) | Wt (g) | Mole % (b) | Sample Time (c) | RV (d) |
| --- | --- | --- | --- | --- | --- |
| 3 | F | 0.3192 | 0.50 | 30 | 0.8135 |
| 3 | F | 0.3192 | 0.50 | 60 | 0.8186 |
| 3 | F | 0.3192 | 0.50 | 110 | 0.8333 |
| A | C | 1.0864 | 1.50 | −5 | 0.9356 |
| A | C | 1.0864 | 1.50 | 10 | 0.9549 |
| A | C | 1.0864 | 1.50 | 30 | 1.0108 |
| A | C | 1.0864 | 1.50 | 60 | 1.0665 |
| A | C | 1.0864 | 1.50 | 120 | 0.9929 |

Notes to Table 1
(a) F is 4,4'-difluorodiphenylsulphone
C is 4,4'-dichlorodiphenylsulphone
(b) Mole % is relative to the quantity of 4,4'-dichlorodiphenylsulphone present in the original mixture.
(c) Minutes from the addition of the 4,4'-difluorodiphenylsulphone or of the 4,4'-dichlorodiphenylsulphone. A negative time indicates that the sample was removed before the addition was made.
(d) RV is the reduced viscosity measured at 25° C. and is determined by dissolving sufficient of the reaction mixture (polymer plus diphenylsulphone solvent) in N,N-dimethylformamide to give 1% by weight of polymer in the solution formed.

EXAMPLE 4

The polycondensation procedure of Example 1 was repeated on a larger scale and a sample of the reaction mixture was removed without introducing any additives thereinto. To a portion of the sample were added 1.6 g of 4,4'-difluorodiphenylsulphone (0.006293 moles, 3.03% molar relative to the 4,4'-dichlorodiphenylsulphone in the original polycondensation mixture). The mixture was then placed in a 250 cm$^3$ flask and heated to 280° C. whilst being stirred in a nitrogen atmosphere. Samples of the mixture were removed at various times after attaining 280° C. The results are given in Table 2, together with those for a portion of the sample to which no addition had been made.

TABLE 2

| Ex or Comp Ex | Additive (e) | Sample Time (f) | RV (d) |
| --- | --- | --- | --- |
| 4 | F3 | 0 | 0.333 |
| 4 | F3 | 240 | 0.339 |
| B | NIL | 0 | 0.6465 |
| B | NIL | 40 | 0.9258 |
| B | NIL | 88 | 0.9626 |
| B | NIL | 133 | 1.1495 |
| B | NIL | 173 | 1.3356 |
| B | NIL | 213 | 1.3404 |
| B | NIL | 263 | 1.4941 |

Notes to Table 2
(d) is as defined in Notes to Table 1.
(e) F3 is 4,4'-difluorodiphenylsulphone in an amount of 3.03% relative to the 4,4'-dichlorodiphenylsulphone. NIL means that there was no addition to the mixture
(f) Time in minutes after attaining 280° C. 0 indicates a sample was removed on attaining 280° C.

EXAMPLE 5

The procedure of Example 1 was repeated on a larger scale.

7.518 kg of 4,4'-dihydroxydiphenylsulphone (30.04M), 8.779 kg of 4,4'-dichlorodiphenylsulphone (30.57M) and 15.2 kg of diphenylsulphone were placed in an autoclave of 68 dm$^3$ capacity fitted with a stirrer and having a nitrogen atmosphere. The contents of the autoclave were heated to 165° C. to give a molten mixture which was stirred. 4.229 kg of finely divided anhydrous potassium carbonate (30.60M) were added over a period of 15 minutes.

30 minutes after completing the addition of the potassium carbonate, the temperature of the autoclave was raised to 209° to 211° C. and stirring of the autoclave contents was continued whilst maintaining that temperature for 90 minutes. The autoclave temperature was then raised to 265° to 275° C. and maintained there for 60 minutes. The autoclave temperature was then raised to 280° to 290° C. Stirring of the autoclave contents was continued and the temperature was maintained at 280° to 290° C. After holding at 280° to 290° C. for some time, a sample of the polycondensation on mixture was removed from the autoclave and tested. Further samples were removed and 4,4'-difluorodiphenyl-sulphone was added to the contents of the autoclave. Stirring was continued, the temperature was maintained at 280° to 290° C. and further samples were removed and tested. Further details are given in Table 3.

COMPARATIVE EXAMPLE C

The procedure of Example 5 was repeated with the exception that 4,4'-dichlorodiphenylsulphone was added rather than 4,4'-difluorodiphenylsulphone.

EXAMPLE 6

The procedure of Example 5 was repeated with the exception that the initial polycondensation mixture contained 8.852 kg of 4,4'-dichlorodiphenyl-sulphone (30.82M).

COMPARATIVE EXAMPLE D

The procedure of Example 6 was repeated with the exception that 4,4'-dichlorodiphenylsulphone was added rather than 4,4'-difluorodiphenylsulphone.

EXAMPLE 7

The procedure of Example 5 was repeated with the exception that a smaller proportion of 4,4'-difluorodiphenylsulphone was added.

COMPARATIVE EXAMPLE E

The procedure of Comparative Example C was repeated with the exception that a larger proportion of 4,4'-dichlorodiphenyl-sulphone was added.

Further details of Examples 5 to 7 and Comparative Examples C to E are given in Table 3. In all of the Examples and Comparative Examples, no sample was removed from the autoclave at the time of adding the 4,4'-difluorodiphenylsulphone or 4,4'-dichlorodiphenylsulphone.

TABLE 3

| Ex | Time (h) | RV (d) | Colour (i) | Comp Ex | Time (h) | RV (d) | Colour (i) |
|---|---|---|---|---|---|---|---|
| 5 | 60 | 0.387 | Y | C | 60 | 0.331 | Y |
| 5 | 70 | 0.401 | Y | C | 70 | 0.391 | Y |
| 5 | 80 | 0.433 | Y | C | 80 | 0.436 | Y |
| 5 | 90 | 0.453 | Y | C | 90 | 0.444 | Y |
| 5 | 95-F1 | nd | nd | C | 95-C1 | nd | nd |
| 5 | 105 | 0.461 | W | C | 105 | 0.472 | L |
| 5 | 115 | 0.456 | W | C | 115 | 0.483 | L |
| 5 | 125 | 0.456 | W | C | 125 | 0.483 | L |
| 5 | 135 | 0.453 | W | C | 135 | 0.500 | L |
| 5 | 155 | 0.448 | W | C | 155 | 0.501 | L |
| 5 | 185 | 0.4542 | W | C | 185 | 0.515 | L |
| 6 | 60 | 0.264 | Y | D | 60 | 0.25 | nd |
| 6 | 90 | 0.423 | Y | D | 90 | 0.337 | nd |
| 6 | 120 | 0.537 | Y | D | 120 | 0.384 | nd |
| 6 | 125-F1 | nd | nd | D | 125-C1 | nd | nd |
| 6 | 155 | 0.534 | W | D | 155 | 0.387 | nd |
| 6 | 185 | 0.531 | W | D | 185 | 0.404 | nd |
| 7 | 60 | 0.354 | Y | E | 60 | 0.402 | Y |
| 7 | 75 | 0.385 | Y | E | 75 | 0.414 | Y |
| 7 | 90 | 0.424 | Y | E | 90 | 0.448 | Y |
| 7 | 95-F0.2 | nd | nd | E | 95-C3 | nd | nd |
| 7 | 100 | 0.395 | W | E | 100 | 0.434 | PB |
| 7 | 115 | 0.412 | W | E | 115 | 0.457 | PB |
| 7 | 145 | 0.414 | W | E | 145 | 0.444 | PB |
| 7 | 175 | 0.425 | W | E | 175 | 0.464 | CB |

Notes to Table Three
(d) is as defined in Notes to Table One.
(h) Time in minutes after achieving 280 to 290° C.
95-F1 indicates that 79 g of 4,4'-difluorodiphenylsulphone (1.02% molar with respect to the initial 4,4'-dichlorodiphenylsulphone) was added after 95 minutes at 280 to 290° C.
125-F1 indicates that 79 g of 4,4'-difluorodiphenylsulphone (1.01% molar with respect to the initial 4,4'-dichlorodiphenylsulphone) was added after 125 minutes at 280 to 290° C.
95-F0.2 indicates that 16 g of 4,4'-difluorodiphenylsulphone (0.21% molar with respect to the initial 4,4'-dichlorodiphenylsulphone) was added after 95 minutes at 280 to 290° C.
95-C1 indicates that 86 g of 4,4'-dichlorodiphenylsulphone (0.98% molar with respect to the initial 4,4'-dichlorodiphenylsulphone) was added after 95 minutes at 280 to 290° C.
125-C1 indicates that 86 g of 4,4'-dichlorodiphenylsulphone (0.97% molar with respect to the initial 4,4'-dichlorodiphenylsulphone) was added after 125 minutes at 280 to 290° C.
95-C3 indicates that 258 g of 4,4'-dichlorodiphenylsulphone (2.94% molar with respect to the initial 4,4'-dichlorodiphenylsulphone) was added after 95 minutes at 280 to 290° C.
Y is yellow
W is white
L indicates a slight decrease in the colour from that of the preceding sample.
CB is chocolate-brown
nd - this quantity was not determined in this experiment.

Notes to Table Three
(d) is as defined in Notes to Table One.
(h) Time in minutes after achieving 280° to 290° C.

95-F1 indicates that 79 g of 4,4'-difluorodiphenylsulphone (1.02% molar with respect to the initial 4,4'-dichlorodiphenylsulphone) was added after 95 minutes at 280° to 290° C.

125-F1 indicates that 79 g of 4,4'-difluorodiphenylsulphone (1.01% molar with respect to the initial 4,4'-dichlordiphenylsulphone) was added after 125 minutes at 280° to 290° C.

95-F0.2 indicates that 16 g of 4,4'-difluorodiphenylsulphone (0.21% molar with respect to the initial 4,4'-dichlorodiphenylsulphone) was added after 95 minutes at 280° to 290° C.

95-C1 indicates that 86 g of 4,4'-dichlorodiphenylsulphone (0.98% molar with respect to the initial 4,4'-dichlorodiphenylsulphone) was added after 95 minutes at 280° to 290° C.

125-C1 indicates that 86 g of 4,4'-dichlorodiphenylsulphone (0.97% molar with respect to the initial 4,4'-dichlorodiphenylsulphone) was added after 125 minutes at 280° to 290° C.

95-C3 indicates that 258 g of 4,4'-dichlorodiphenylsulphone (2.94% molar with respect to the initial 4,4'-dichlorodiphenylsulphone) was added after 95 minutes at 280° to 290° C.

Y is yellow
W is white
L indicates a slight decrease in the colour from that of the preceding sample.
CB is chocolate-brown
nd-this quantity was not determined in this experiment.

We claim:
1. A process for producing a polyarylene sulphone by polycondensing, in the presence of an alkali metal carbonate, one or more bis(chloroaryl)sulphones and one or more dihydric phenols, adding 4,4'-difluorodiphenyl sulphone to the resulting mixture and reacting the mixture further; in which

(a) the amount of bis(chloroaryl)sulphone condensed is up to 6% mole excess over the amount of dihydric phenol;
(b) the added 4,4'-difluorodiphenylsulphone is up to 5% equivalent of the bis(chloroaryl)sulphone;
(c) the 4,4'-difluorodiphenylsulphone is added after the polycondensation is essentially complete; and
(d) after adding the 4,4'-difluorodiphenylsulphone reaction is continued at least 0.1 hour.

2. A process according to claim 1 in which in the bis(chloroaryl)sulphone the or each chlorine is ortho-or para- to a sulphone group.

3. A process according to claim 2 in which the bis(chloroaryl)sulphone is 4,4'-dichlorodiphenylsulphone.

4. A process according to claim 1 in which the dihydric phenol is selected from hydroquinone, 4,4'-dihydroxybiphenyl, 4,4'-dihydroxydiphenylsulphone or 2,2-bis (4-hydroxyphenyl) propane.

5. A process according to claim 1 in which dihydricphenol is polycondensed with an excess of up to 6% mole of aryldichloride.

6. A process according to claim 1 in which a temperture in the range 200°–400° C. is maintained for at least part of the polycondensation reaction.

7. A process according to claim 1 in which the 4,4'-difluorodiphenylsulphone is added to the mixture of bis(chloroaryl)sulphone and dihydric phenol at least 0.5 hour after the mixture has attained a maximum temperature in the range 250°–350° C.

8. A process according to claim 1 in which the polycondensing is continued until the reaction mixture attains an essentially constant viscosity, whereafter the 4,4'-difluorodiphenylsulphone is added.

9. A process according to claim 1 in which an increase in polymer molecular weight is prevented by adding up to 0.5% molar of 4,4-difluorodiphenylsulphone, or in which the polymer molecular weight is decreased by adding 0.5 to 5% molar of 4,4'-difluorodiphenylsulphone.

10. A process according to claim 1 comprising polycondensing in the presence of a solvent which is an aromatic sulphoxide or sulphone of the formula R—$SO_a$—$R^1$ where R and $R^1$ are aryl and a is 1 or 2.

* * * * *